United States Patent
Kurihara et al.

(10) Patent No.: US 9,852,755 B2
(45) Date of Patent: Dec. 26, 2017

(54) THIN FILM MAGNETIC HEAD, HEAD GIMBALS ASSEMBLY, HEAD ARM ASSEMBLY, AND MAGNETIC DISK UNIT

(71) Applicants: TDK CORPORATION, Tokyo (JP); SAE MAGNETICS (H.K.) LTD., Shatin (HK)

(72) Inventors: Katsuki Kurihara, Tokyo (JP); Yosuke Antoku, Tokyo (JP); Norio Takahashi, Shatin (HK)

(73) Assignees: TDK CORPORATION, Tokyo (JP); SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 15/141,578

(22) Filed: Apr. 28, 2016

(65) Prior Publication Data

US 2017/0316798 A1 Nov. 2, 2017

(51) Int. Cl.
G11B 5/60 (2006.01)
G11B 5/48 (2006.01)

(52) U.S. Cl.
CPC .......... *G11B 5/6076* (2013.01); *G11B 5/4826* (2013.01)

(58) Field of Classification Search
CPC ....... G11B 15/06; G11B 15/689; G11B 15/00; G11B 5/00821
USPC ........................................................ 360/92.1
See application file for complete search history.

(56) References Cited

U.S. PATENT DOCUMENTS

| | | | |
|---|---|---|---|
| 5,991,113 A | 11/1999 | Meyer et al. | |
| 7,068,468 B2 | 6/2006 | Kamijima | |
| 8,351,157 B2 | 1/2013 | Nishioka et al. | |
| 8,373,947 B1 | 2/2013 | Nojima et al. | |
| 8,542,456 B2 | 9/2013 | Yamane et al. | |
| 8,811,127 B1* | 8/2014 | Hirata | G11B 5/3133 369/13.13 |
| 9,208,804 B1* | 12/2015 | Isowaki | G11B 5/3912 |
| 9,513,349 B2* | 12/2016 | Gill | G11B 5/3912 |
| 9,601,484 B2* | 3/2017 | Herget | H01L 27/0641 |
| 9,613,897 B2* | 4/2017 | Bhatkar | H01L 23/5227 |
| 2003/0174430 A1 | 9/2003 | Takahashi et al. | |
| 2004/0150921 A1* | 8/2004 | Kagami | B82Y 25/00 360/324.1 |
| 2007/0030592 A1* | 2/2007 | Shintani | G11B 5/3163 360/125.12 |
| 2007/0236836 A1 | 10/2007 | Kurita et al. | |
| 2008/0239583 A1* | 10/2008 | Sakamoto | G11B 5/3133 360/315 |
| 2008/0273274 A1* | 11/2008 | Kojima | B82Y 10/00 360/315 |
| 2008/0278863 A1* | 11/2008 | Nishimura | B82Y 10/00 360/324.11 |

(Continued)

FOREIGN PATENT DOCUMENTS

JP 2003168274 A 6/2003
JP 2003272335 A 9/2003

(Continued)

*Primary Examiner* — Allen T Cao
(74) *Attorney, Agent, or Firm* — Oliff PLC

(57) ABSTRACT

This thin film magnetic head includes a magnetic pole including an end surface exposed on an air bearing surface, and a contact detection section including a magnetic material layer provided near the air bearing surface, and a magnetic-domain stabilizing structure stabilizing a magnetic domain structure of the magnetic material layer.

13 Claims, 5 Drawing Sheets

(56) References Cited

U.S. PATENT DOCUMENTS

| | | | | |
|---|---|---|---|---|
| 2008/0316656 A1* | 12/2008 | Miyata | ................... | B82Y 10/00 360/324.2 |
| 2009/0162698 A1* | 6/2009 | Fukuzawa | .............. | B82Y 25/00 428/811.2 |
| 2012/0008230 A1* | 1/2012 | Nishioka | ................ | B82Y 25/00 360/59 |

FOREIGN PATENT DOCUMENTS

| JP | 2007280502 A | 10/2007 |
|---|---|---|
| JP | 2008165950 A | 7/2008 |

\* cited by examiner

THIN FILM MAGNETIC HEAD, HEAD GIMBALS ASSEMBLY, HEAD ARM ASSEMBLY, AND MAGNETIC DISK UNIT

BACKGROUND OF THE INVENTION

1. Technical Field

The invention relates to a thin film magnetic head, a head gimbals assembly, a head arm assembly, and a magnetic disk unit each including a magnetic reproducing head section and a magnetic recording head section.

2. Background Art

Magnetic disk units have been theretofore used as a unit that records and reproduces magnetic information (hereinafter, simply referred to as information). Each of the magnetic disk units may include, for example, in a housing thereof, a magnetic disk in which information is stored, and a thin film magnetic head that records information into the magnetic disk and reproduces information stored in the magnetic disk. The magnetic disk is supported by a rotary shaft of a spindle motor fixed to the housing, and is configured to rotate around the rotary shaft. In contrast, the thin film magnetic head is formed on a side surface of a magnetic head slider provided on one end of a suspension, and configured to include a magnetic recording element and a magnetic reproducing element that have an air bearing surface (ABS) facing the magnetic disk. In particular, as the magnetic reproducing element, a magnetoresistive (MR) element exhibiting MR effect is generally used. The other end of the suspension is attached to an end of an arm pivotally supported by a fixed shaft standing inside the housing.

When the magnetic disk unit is in a stationary state, namely, when the magnetic disk remains stationary without rotating, the ABS of the thin film magnetic head is in contact with a surface of the magnetic disk while being lightly pressed against the surface by biasing force of the suspension. Here, when the magnetic disk unit enters a driven state, and the magnetic disk starts to rotate, the magnetic head slider slightly floats to form a fine distance (magnetic spacing) between the ABS and the surface of the magnetic disk. Stabilizing the amount of this floating makes it possible to record and reproduce information accurately.

Incidentally, in recent years, along with an increase in recording density (an increase in capacity) of the magnetic disk, the recording track width has been reduced. When the recording track width is reduced, the size of the thin film magnetic head is also reduced, which weakens the signal recording ability of the magnetic recording element on the magnetic disk and weakens the intensity of signal magnetic field from the magnetic disk. To compensate deterioration of these functions, it is necessary to reduce the magnetic spacing further (to bring the ABS of the thin film magnetic head and the surface of the magnetic disk close to each other).

Under the circumstances, the floating height of the entire magnetic head slider has been reduced, but sufficient control has not been achieved, which has brought the thin film magnetic head into contact with a part such as a fine projection on the surface of the magnetic disk, thereby causing issues such as occurrence of an abnormal signal due to heat generation, and abrasion of the thin film magnetic head itself.

To address such issues, the applicant has proposed a thin film magnetic head in which a heating means is provided on a side of a magnetic conversion element including a magnetic recording element and a magnetic reproducing element, the side being opposite to the ABS (refer to Japanese Unexamined Patent Application Publication No. 2003-168274). In this thin film magnetic head, when a magnetic disk unit is driven, thermal expansion of surrounding parts of a heating element occurs due to heat generated by the heating element, and this thermal expansion is utilized to protrude the magnetic conversion element toward the ABS side, thereby achieving minute magnetic spacing. In this operation, the heat generation amount is controlled to adjust the degree of the protrusion with high accuracy, and the magnetic spacing is stably maintained even if this spacing is minute. A considerable reduction in the probability of contact between a surface of a magnetic disk and the thin film magnetic head is therefore achieved.

Further, after the disclosure of the above-described thin film magnetic head, there has been proposed a thin film magnetic head in which a temperature detection section is mounted, and an amount of a current supplied to a heating element is controlled, based on information representing a detected temperature (for example, refer to Japanese Unexamined Patent Application Publication No. 2003-272335). In this thin film magnetic head, a pair of heating elements are so provided as to sandwich a magnetic conversion element along a rotation direction of a magnetic disk, and the temperature detection section is provided between one of the heating elements and the magnetic conversion element. In addition, a magnetic disk unit, which includes a magnetic head slider having a heating element, and an arm provided with a temperature sensor (for example, refer to U.S. Pat. No. 5,991,113), has been disclosed as relevant prior art. Further, a magnetic head slider, in which two heaters are provided in one layer close to a thin film magnetic head, has been disclosed in Japanese Unexamined Patent Application Publication No. 2008-165950. Furthermore, a magnetic head slider, which includes a heater disposed near a reproducing element, has been disclosed in Japanese Unexamined Patent Application Publication No. 2007-280502.

In connection with these disclosures, the applicant has already proposed a thin film magnetic head and the like, in which both of a magnetic reproducing head section and a magnetic recording head section each have one set of a heat generation means and a temperature detection means (refer to U.S. Pat. No. 8,351,157).

In recent years, however, a further increase in recording density (increase in capacity) of the magnetic disk has been implemented and, therefore, in the future, strong demand for further downsizing of the thin film magnetic head to support this increase is expected.

Therefore, it is desirable to provide a thin film magnetic head and the like that make it possible to perform control with higher accuracy, for a floating height of a magnetic head slider.

SUMMARY OF INVENTION

A first thin film magnetic head according to an embodiment of the invention includes: a magnetic pole including an end surface exposed on an air bearing surface facing a medium; and a contact detection section. The contact detection section detects contact between the medium and the air bearing surface, and includes a magnetic material layer provided near the air bearing surface, and a magnetic-domain stabilizing structure stabilizing a magnetic domain structure of the magnetic material layer.

A head gimbals assembly, a head arm assembly, and a magnetic disk unit according to respective embodiments of the invention each include the above-described first thin film magnetic head.

In the first thin film magnetic head according to the embodiment of the invention, the head gimbals assembly, the head arm assembly, and the magnetic disk unit each of which includes the first thin film magnetic head, the contact detection section includes the magnetic-domain stabilizing structure stabilizing the magnetic domain structure of the magnetic material layer provided near the air bearing surface. For this reason, temporal variations in the magnetic domain structure of the magnetic material layer due to influence of a disturbance magnetic field such as a magnetic field based on a servo signal, for example, are suppressed. Therefore, occurrence of noise due to the disturbance magnetic field is removed, which makes it possible to detect contact between the air bearing surface of the thin film magnetic head and the medium such as a magnetic disk with high accuracy. As a result, it is possible to control a floating height of a magnetic head slider with higher accuracy.

In the first thin film magnetic head according to the embodiment of the invention, an antiferromagnetic material layer forming a laminated body with the magnetic material layer may be provided as the magnetic-domain stabilizing structure.

In the first thin film magnetic head according to the embodiment of the invention, the magnetic material layer may have an opening passing therethrough in a thickness direction as the magnetic-domain stabilizing structure. In this case, the magnetic material layer may include a central region having a first height in a height direction orthogonal to the air bearing surface, and a pair of end regions facing each other with the central region provided therebetween and each having a second height less than the first height in the height direction, and the opening may be provided in the central region of the magnetic material layer. This is because increasing the size of the central region in the magnetic material layer allows a larger detection current to flow from one of the end regions to the other of the end regions, thereby enhancing detection sensitivity.

In the first thin film magnetic head according to the embodiment of the invention, a temperature coefficient of resistance of the magnetic material layer may be desirably higher than a temperature coefficient of resistance of the magnetic pole. Specifically, the magnetic material layer may be made of a simple substance of nickel (Ni) or an alloy including nickel or iron.

The first thin film magnetic head according to the embodiment of the invention may further include a heating element heating a vicinity of the magnetic pole. This is because the floating height is easily controlled.

A second thin film magnetic head according to another embodiment of the invention includes: a magnetic pole including an end surface exposed on an air bearing surface facing a medium; and a contact detection section including a magnetic material layer provided near the air bearing surface, the contact detection section being configured to detect contact between the medium and the air bearing surface. The magnetic material layer includes a central region having a first height in a height direction orthogonal to the air bearing surface, and a pair of end regions facing each other with the central region provided therebetween and each having a second height less than the first height in the height direction. A head gimbals assembly, a head arm assembly, and a magnetic disk unit each according to another embodiment of the invention each include the above-described second thin film magnetic head.

In the second thin film magnetic head according to the embodiment of the invention, and the head gimbals assembly, the head arm assembly, and the magnetic disk unit each of which includes the second thin film magnetic head, in the magnetic material layer of the contact detection section, the first height in the central region is greater than the second height of the pair of end regions. This makes it possible to flow a larger detection current through the magnetic material layer, and to suppress variations in electric resistance value of the contact detection section due to manufacturing error. Detection accuracy is thereby enhanced. Moreover, it is possible to suppress an increase in temperature of the magnetic material layer, and an increase in the life thereof is also expected.

DESCRIPTION OF EMBODIMENTS

An embodiment of the invention is described in detail below with reference to drawings.

<Configuration of Magnetic Disk Unit>

Figure 1:
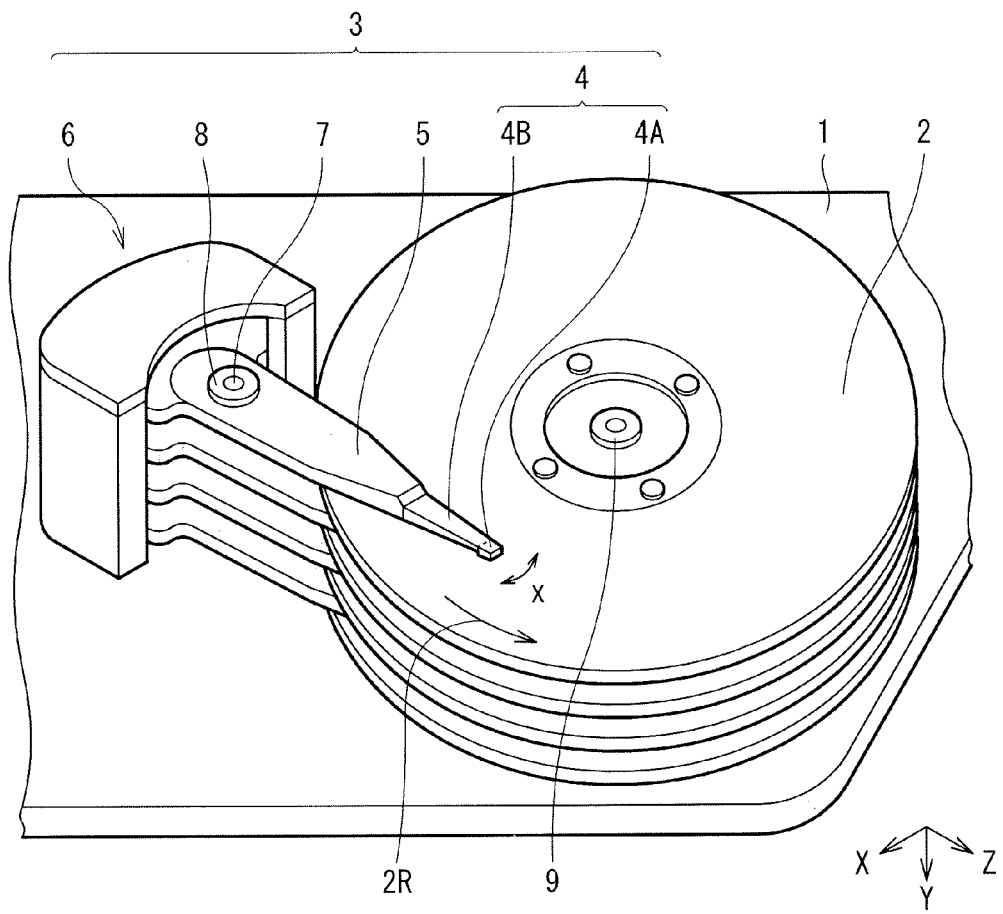
FIG. 1 is a perspective view illustrating a configuration of a magnetic disk unit including a thin film magnetic head according to an embodiment of the invention.

First, referring to FIG. 1 and FIG. 2, a configuration of a magnetic disk unit according to an embodiment of the invention is described below. FIG. 1 is a perspective view illustrating an internal configuration of the magnetic disk unit according to the present embodiment. The magnetic disk unit adopts a contact-start-stop (CSS) operation system as a driving system, and may include, for example, in a housing 1, a magnetic disk 2 serving as a magnetic recording medium in which information is to be recorded, and a head arm assembly (HAA) 3 for recording of information in the magnetic disk 2 and reproduction of the information. The HAA 3 includes a head gimbals assembly (HGA) 4, an arm 5 supporting a base of the HGA 4, and a driver 6 serving as a power source allowing the arm 5 to pivot. The HGA 4 includes a magnetic head slider (hereinafter, simply referred to as a "slider") 4A having a side surface provided with a thin film magnetic head 10 (described later) according to the present embodiment, and a suspension 4B having an end to which the slider 4A is attached. The arm 5 supports the other end of the suspension 4B (an end opposite to the end provided with the slider 4A). The arm 5 is so configured as to be pivotable, through a bearing 8, around a fixed shaft 7 fixed to the housing 1. The driver 6 may be configured of, for example, a motor such as a voice coil motor. Note that the magnetic disk unit has a plurality of (four in FIG. 1) magnetic disks 2, and the sliders 4A are disposed corresponding to recording surfaces (a front surface and a back surface) 2S of the respective magnetic disks 2. Each of the sliders 4A is movable in a direction across recording tracks (in an X-axis direction) in a plane parallel to the recording surfaces 2S of each of the magnetic disks 2. In contrast, the magnetic disk 2 is configured to rotate around a spindle motor 9 fixed to the housing 1, in a rotation direction 2R substantially orthogonal to the X-axis direction. The rotation of the magnetic disk 2 and the movement of the slider 4A cause information to be recorded into the magnetic disk 2 or cause recorded information to be read out.

Figure 2:
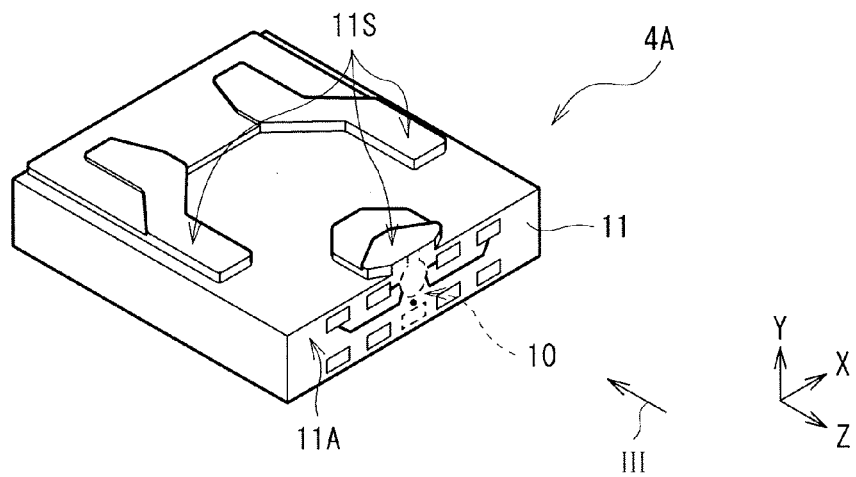
FIG. 2 is a perspective view illustrating a configuration of a slider in the magnetic disk unit illustrated in FIG. 1.

FIG. 2 illustrates a configuration of the slider 4A illustrated in FIG. 1. The slider 4A has a block-shaped base 11 that may be formed of, for example, AlTiC ($Al_2O_3$-TiC). The base 11 may be substantially formed as a hexahedron, for example, and one surface thereof corresponds to an air bearing surface (ABS) 11S that is disposed in proximity to and facing the recording surface 2S of the magnetic disk 2. When the magnetic disk unit is not driven, namely, when the spindle motor 9 is stopped and the magnetic disk 2 does not rotate, the ABS 11S and the recording surface 2S are in contact with each other. When the magnetic disk 2 starts to rotate at a high speed by the spindle motor 9, air flow occurs between the recording surface 2S and the ABS 11S, and the slider 4A floats along a direction orthogonal to the recording surface 2S (in an Y-axis direction) due to lift force caused by the air flow, thereby forming a certain distance (magnetic spacing) between the ABS 11S and the magnetic disk 2. In addition, the thin film magnetic head 10 is provided on an element forming surface 11A that is one side surface orthogonal to the ABS 11S.

<Detailed Configuration of Thin Film Magnetic Head 10>

Next, the thin film magnetic head 10 is described in more detail with reference to FIG. 3 and FIG. 4.

Figure 3:
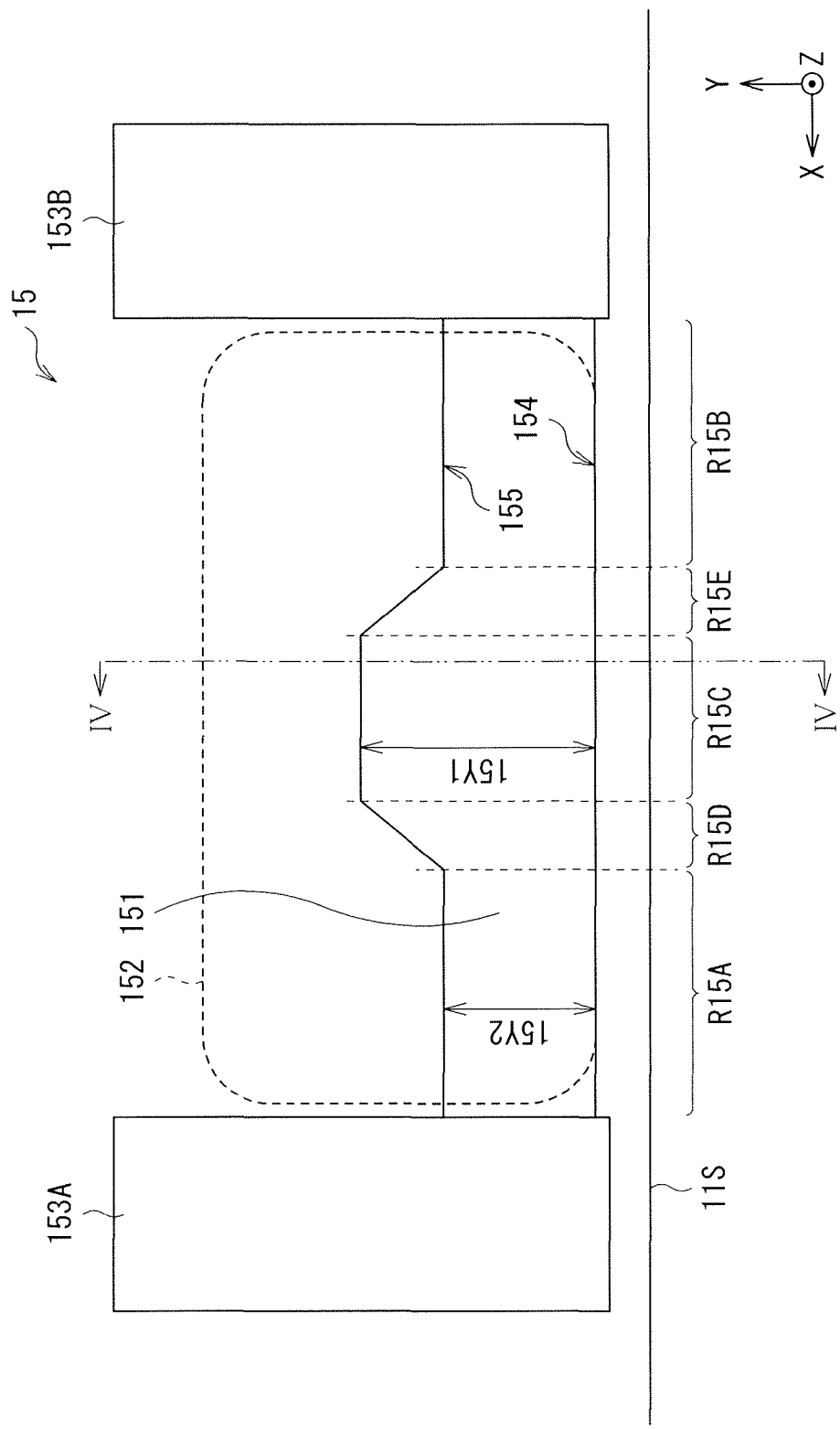
FIG. 3 is a plan view illustrating a structure of a main part of the thin film magnetic head illustrated in FIG. 2 as viewed from an arrow III direction.

FIG. 3 is a plan view illustrating a shape of a resistance sensor 15 of the thin film magnetic head 10 as viewed from a direction of an arrow III illustrated in FIG. 2. FIG. 4 is a sectional diagram of the thin film magnetic head 10 at a center position thereof in a track width direction, and illustrates a structure in an arrow direction along a line IV-IV illustrated in FIG. 3. Note that an up-arrow M illustrated in FIG. 4 indicates a direction in which the magnetic disk 2 moves relative to the thin film magnetic head 10.

In the following description, dimensions in the X-axis direction, the Y-axis direction, and the Z-axis direction are referred to as "width", "height", and "thickness", respectively, and closer side and farther side to/from the ABS 11S in the Y-axis direction are referred to as "forward" and "backward", respectively. Moreover, front side and back side in the direction of the arrow M are referred to as "trailing side" and "leading side", respectively, and the X-axis direction and the Z-axis direction are referred to as "cross track direction" and "down track direction", respectively.

The thin film magnetic head 10 is provided to perform magnetic processing on the magnetic disk 2, and may be, for example, a composite head allows for execution of both reproducing processing and recording processing. As illustrated in FIG. 4, for example, the thin film magnetic head 10 may include an insulating layer 13, a reproducing head section 14, a recording head section 16, and a protective layer 17 that are stacked in this order on the base 11. The thin film magnetic head 10 has the ABS 11S as one side surface common to these layers. An insulating layer 25, an intermediate shield layer 26, and an insulating layer 27 that are stacked in order on the reproducing head section 14 are provided between the reproducing head section 14 and the recording head section 16.

The insulating layer 13 and the protective layer 17 may be formed of, for example, a non-magnetic insulating material such as aluminum oxide. Examples of aluminum oxide may include alumina ($Al_2O_3$).

(Reproducing Head Section 14)

The reproducing head section 14 performs reproducing processing by utilizing magneto-resistive effect (MR). The reproducing head section 14 may be configured by stacking, for example, a lower shield layer 21, an MR element 22, and an upper shield layer 23 in this order on the insulating layer 13.

The lower shield layer 21 and the upper shield layer 23 may be each formed of, for example, a soft magnetic metal material such as a nickel-iron alloy (NiFe), and are disposed to face each other with the MR element 22 in between in the stacking direction (in the Z-axis direction). The lower shield layer 21 and the upper shield layer 23 each have a side surface exposed on the ABS 11S, and extend backward from the ABS 11S. Such a configuration allows the lower shield layer 21 and the upper shield layer 23 to exert a function of magnetically isolating the MR element 22 from its surroundings and protecting the MR element 22 from influence of unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 may be formed of an insulating material such as aluminum oxide ($Al_2O_3$), aluminum nitride (AlN), silicon dioxide ($SiO_2$), and diamond-like carbon (DLC).

The MR element 22 functions as a sensor to read out magnetic information recorded in the magnetic disk 2. The MR element 22 may be, for example, a current perpendicular to plane (CPP)-giant magnetoresistive (GMR) element, sense current of which flows inside thereof in a stacking direction. Here, the lower shield layer 21 and the upper shield layer 23 each function as an electrode to supply the sense current to the MR element 22.

In the reproducing head section 14 having such a configuration, a magnetization direction of a free layer (not illustrated) included in the MR element 22 changes in response to a signal magnetic field from the magnetic disk 2. Therefore, the magnetization direction of the free layer changes relative to a magnetization direction of a pinned layer (not illustrated) also included in the MR element 22. When the sense current flows through the MR element 22, the relative change of the magnetization direction appears as a change of the electric resistance, and the signal magnetic field is detected with use of this change and the magnetic information is accordingly read out.

As mentioned above, the insulating layer 25, the intermediate shield layer 26, and the insulating layer 27 are stacked in order on the reproducing head section 14. The resistance sensor 15 that is partially exposed on the ABS 11S is embedded in the insulating layer 27. The resistance sensor 15 will be described later in detail. A lower yoke 28 forming a part of the recording head section 16 is provided on the insulating layer 27. The backward of the lower shield layer 21 is occupied by an insulating layer 20A, the backward of the upper shield layer 23 is occupied by an insulating layer 20B, the backward of the intermediate shield layer 26 is occupied by an insulating layer 20C, and the backward of the lower yoke 28 is occupied by an insulating layer 20D. Note that, in the specification, the insulating layers 20A to 20D are collectively referred to as an insulating layer 20 in some cases. The intermediate shield layer 26 functions to prevent a magnetic field generated in the recording head section 16 from reaching the MR element 22, and may be made of, for example, a soft magnetic metal material such as NiFe. The insulating layers 25 and 27 may be each made of a material similar to that of the insulating layer 24, for example.

(Recording Head Section 16)

The recording head section 16 is a so-called perpendicular magnetic recording head performing recording processing of perpendicular magnetic recording system. The recording head section 16 may include, for example, the lower yoke 28, a lower coil 18 and a leading shield 29 that are embedded in an insulating layer 31, a heating element 50, a magnetic pole 32, a pedestal yoke 33, an upper coil 41 embedded in the insulating layer 34, and an upper yoke 43 that are stacked in this order on the insulating layer 27. A space between the lower coil 18 and the upper coil 41 at the back of the leading shield 29 is occupied by the insulating layer 31 (311 to 319). The heating element 50 is embedded in the insulating layer 31.

The recording head section 16 further includes a back gap BG configured of a lower back gap 19 and an upper back gap 44. The lower back gap 19 is coupled to the lower yoke 28, and the upper back gap 44 is coupled to the upper yoke 43. Here, the lower back gap 19 is configured by stacking magnetic layers 191 to 193 in order on the lower yoke 28. In addition, the upper back gap 44 is configured by stacking a magnetic layer 441 and a magnetic layer 442 in order on the magnetic layer 193 of the lower back gap 19. A top surface of the magnetic layer 442 is in contact with a bottom surface of the upper yoke 43.

The upper coil 41 generates, in response to supply of a current, a recording-use magnetic flux inside a magnetic path that is configured mainly by the leading shield 29, the lower yoke 28, the lower back gap 19, the upper back gap 44, the upper yoke 43, and the magnetic pole 32. In contrast, the lower coil 18 generates a magnetic flux for prevention of leakage mainly in order to prevent the recording-use magnetic flux generated in the upper coil 41 from unintentionally reaching (being leaked) to the reproducing head section 14. The current flows through the lower coil 18 in a direction opposite to a direction of the current flowing through the upper coil 41. The lower coil 18 and the upper coil 41 each may be formed of, for example, a high electroconductive material such as copper (Cu), and have a structure (a spiral structure) winding around a region occupied by the back gap BG (the lower back gap 19 and the upper back gap 44) in the stacked-layer plane (in the XY plane). The lower coil 18 is provided on the insulating layer 311 and is embedded in the insulating layer 312 and the insulating layer 313. The upper coil 41 is provided on the insulating layer 319 and is embedded in the insulating layer 34. Further, a part of a backward part 182 of the lower coil 18 and a part of a backward part 412 of the upper coil 41 are coupled to each other through a pillar 36 that extends in a thickness direction to penetrate the insulating layer 31. The lower coil 18 and the upper coil 41 are coupled in series to each other through the pillar 36. The pillar 36 has a stacked structure configured of electroconductive layers 361 to 365 that are stacked in order between the backward part 182 of the lower coil 18 and the backward part 412 of the upper coil 41. Note that, in FIG. 3, only the ABS 11S, the upper coil 41, the back gap BG, the pillar 36, and the heating element 50 are illustrated and other components such as the lower coil 18 are not illustrated in order not to spoil visibility.

Figure 4:
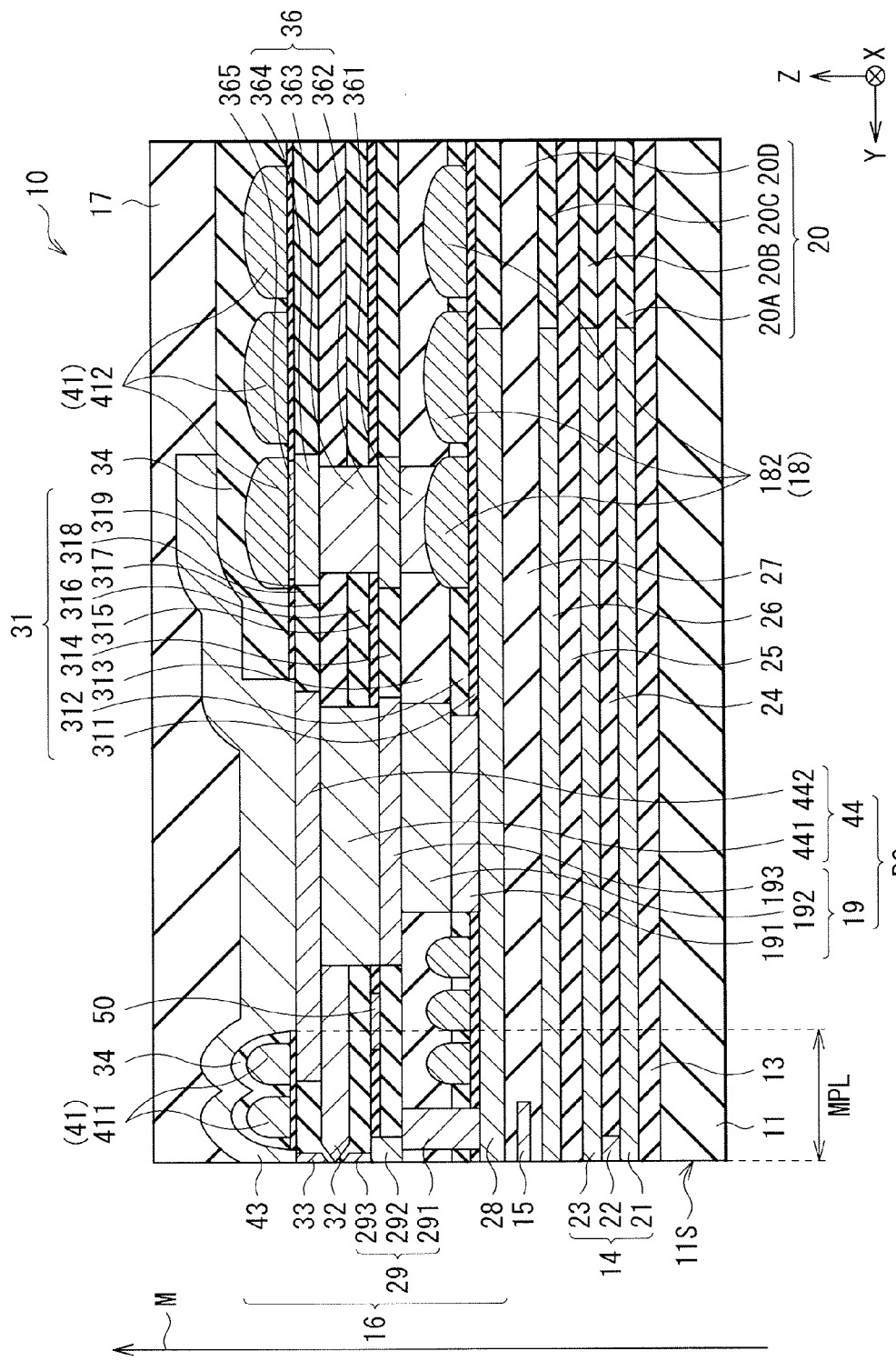
FIG. 4 is a sectional diagram illustrating a structure of the thin film magnetic head illustrated in FIG. 3 in an arrow direction along a line IV-IV.

A forward part 181 of the lower coil 18, namely, a part located between the lower back gap 19 and the ABS 11S, may desirably have a smaller size in the Y direction, than the size, in the Y direction, of the backward part 182 of the lower coil 18 that is located at the back of the lower back gap 19 (FIG. 4). Likewise, the size, in the Y direction, of a forward part 411 of the upper coil 41 that is located between the upper back gap 44 and the ABS 11S may be desirably smaller than the size, in the Y direction, of the backward part 412 of the upper coil 41 that is located at the back of the upper back gap 44 (FIG. 4). This is because making the forward part 181 and the forward part 411 smaller in the Y direction is advantageous to a reduction in magnetic path length MPL (see FIG. 4).

The lower yoke 28, the leading shield 29, the lower back gap 19, the upper yoke 43, the upper back gap 44, and the pillar 36 are each formed of, for example, a soft magnetic metal material with high saturation flux density such as NiFe. The lower yoke 28 and the upper yoke 43 are magnetically coupled to each other through the back gap BG. The leading shield 29 is coupled to a forward part of the top surface of the lower yoke 28, and is so disposed as to be partially exposed on the ABS 11S. The leading shield 29 may have a structure in which, for example, a lower layer part 291, an intermediate part 292, and an upper layer part 293 are stacked in order along the ABS 11S. In the example of FIG. 4, the lower layer part 291 is provided at a position slightly receded from the ABS 11S, and the intermediate part 292 and the upper layer part 293 are so provided as to be exposed on the ABS 11S. The insulating layers 311 to 316 are so stacked in order at the back of the leading shield 29 as to cover the lower yoke 28 and to bury the lower coil 18.

The leading shield 29 functions as a return path on the leading side, and disperses a part of a recording magnetic field emitted from the magnetic pole 32 to the leading side, thereby reducing a wide adjacent track erase (WATE) effective magnetic field. The WATE effective magnetic field means an effective magnetic field that influences adjacent tracks in a wide region (for example, two to ten tracks adjacent to a track to be written).

The magnetic pole 32 contains the magnetic flux generated in the lower coil 18 and the upper coil 41, and emits the magnetic flux from the ABS 11S, thereby generating a recording magnetic field. This magnetic pole 32 is configured to extend backward from the ABS 11S, and may be formed of, for example, a magnetic material with high saturation flux density such as an iron-based alloy. Examples of the iron-based alloy may include an iron-cobalt alloy (FeCo) and an iron-cobalt-nickel alloy (FeCoNi).

In the recording head section 16 having such a configuration, a magnetic flux is generated, by the current (the write current) flowing through the upper coil 41, inside the magnetic path configured mainly by the leading shield 29, the lower yoke 28, the lower back gap 19, the upper back gap 44, the upper yoke 43, and the magnetic pole 32.

As a result, the recording magnetic field (the signal magnetic field) is generated near the end surface of the magnetic pole 32 exposed on the ABS 11S, and the recording magnetic field reaches a predetermined region of the recording surface of the magnetic disk 2.

(Detailed Configuration of Resistance Sensor 15)

The resistance sensor 15 functions as a contact detection section that detects contact between the magnetic disk 2 and the ABS 11S of the thin film magnetic head 10. As illustrated in FIG. 3, the resistance sensor 15 includes a magnetic material layer 151 provided near the ABS 11S, and an antiferromagnetic material layer 152 serving as a magnetic-domain stabilizing structure that stabilizes a magnetic domain structure of the magnetic material layer 151. A pair of electrodes 153A and 153B are connected to respective ends of the magnetic material layer 151 in the track width direction. The resistance sensor 15 detects heat generation caused by the contact between the thin film magnetic head 10 and the magnetic disk 2, based on a variation (increase) in electric resistance value thereof.

The magnetic material layer 151 may have an end surface exposed on the ABS 11S, but may be provided at a position receded from the ABS 11S by a distance of about 10 nm to about 200 nm. The magnetic material layer 151 includes a forward edge 154 extending in the track width direction along the ABS 11S, and a backward edge 155 including a part nonparallel to the ABS 11S (an inclination part inclined to the ABS 11S). Examples of a material of the magnetic material layer 151 may include, in addition to NiFe, nickel (Ni), titanium (Ti), tungsten (W), platinum (Pt), tantalum (Ta), ruthenium (Ru), gold (Au), and an alloy containing one or more of these elements. Further, the magnetic material layer 151 may have a multilayer structure formed of same material or different materials (for example, a synthetic structure in which ruthenium is sandwiched between two or more ferromagnetic layers), without being limited to a single-layer structure. However, it is desirable to adopt a material having a temperature coefficient of resistance (TCR) greater than at least the TRC of the magnetic pole 32.

As illustrated in FIG. 3, the magnetic material layer 151 includes, in the XY plane, a central region R15C, and a pair of end regions R15A and R15B facing each other with the central region R15C provided therebetween in the track width direction (the X-axis direction). The central region R15C has a height 15Y1 in a height direction (the Y-axis direction) orthogonal to the ABS 11S. The end regions R15A and R15B each have a height 15Y2 that is less than the height 15Y1. Further, a connection region R15D having a varying height is provided between the end region R15A and the central region R15C, and a connection region R15E having a varying height is provided between the end region R15B and the central region R15C. The backward edge 155 is substantially parallel to the ABS 11S in the central region R15C and the end regions R15A and R15B, but is inclined to the ABS 11S in the connection regions R15D and R15E. Further, the end region R15A is connected to the electrode 153A at an end opposite to the connection region R15D, and the end region R15B is connected to the electrode 153B at an end opposite to the connection region R15E.

A thickness (the dimension in the Z-axis direction) of the magnetic material layer 151 in the central region R15C and a thickness of the magnetic material layer 151 in the pair of end regions R15A and R15B may be desirably equal to each other. This is to ensure flatness of the thin film magnetic head 10, without forming an unnecessary step. The magnetic material layer 151 has a larger cross-sectional area in the central region R15C, than those of the pair of end regions R15A and R15B. In other words, in a YZ cross section, a cross-sectional area (a first cross-sectional area) of the central region R15C is larger than a cross-sectional area (a second cross-sectional area) of the end region R15A and a cross-sectional area (a third cross-sectional area) of the end region R15B. Note that, the cross-sectional area (the second cross-sectional area) of the end region R15A and the cross-sectional area (the third cross-sectional area) of the end region R15B may be desirably substantially equal to each other, but may be different. This allows a larger detection current to be flowed through the magnetic material layer 151, as compared with a case where the cross-sectional area of the magnetic material layer 151 in the central region R15C and the cross-sectional area of the magnetic material layer 151 in the end region R15B area are equal to each other. In addition, according to the magnetic material layer 151, as compared with a magnetic material layer having a shape in which a dimension in a height direction is constant, a rise in the own temperature is suppressed when a current of a certain current value is flowed and, therefore, an improvement in life is expected. Moreover, in the magnetic material layer 151, the cross-sectional area of the central region R15C is larger than other part (the cross-sectional area of the end region R15A and the cross-sectional area of the end region R15B). Therefore, it is possible to reduce variations in the electric resistance value in the resistance sensor 15 that accompany variations (unevenness) in the dimensions in the formation of the ABS 11S due to polishing.

Examples of a material of the antiferromagnetic material layer 152 may include, in addition to a platinum-manganese alloy (PtMn), alloys such as a manganese-palladium alloy (MnPd), a gold-manganese alloy (AuMn), a ferromanganese alloy (FeMn), and an iridium-manganese alloy (IrMn). Further, the antiferromagnetic material layer 152 may be formed of simple metal such as chromium (Cr) and manganese (Mn). Furthermore, the antiferromagnetic material layer 152 may also be formed using oxide including one or more of elements such as chromium (Cr), manganese (Mn), iron (Fe), cobalt (Co), and nickel (Ni).

The heating element 50 functions to reduce the distance between the ABS 11S and the surface of the magnetic disk 2, by generating heat to cause the vicinity thereof to thermally expand, thereby protruding the ABS 11S of the thin film magnetic head 10. For example, the heating element 50 forms a linear pattern expanding along the stacking surface on the insulating layer 314, and may be made of, for example, an electroconductive material containing one or more of a nickel-chromium alloy (NiCr), a nickel-copper alloy (NiCu), copper (Cu), gold (Au), nickel (Ni), cobalt (Co), tantalum (Ta), tungsten (W), molybdenum (Mo), and rhodium (Rh). The heating element 50 is supplied with a current, thereby generating heat, based on the resistance thereof.

<Operation, Action, and Effects of Magnetic Disk Unit>

Figure 5:
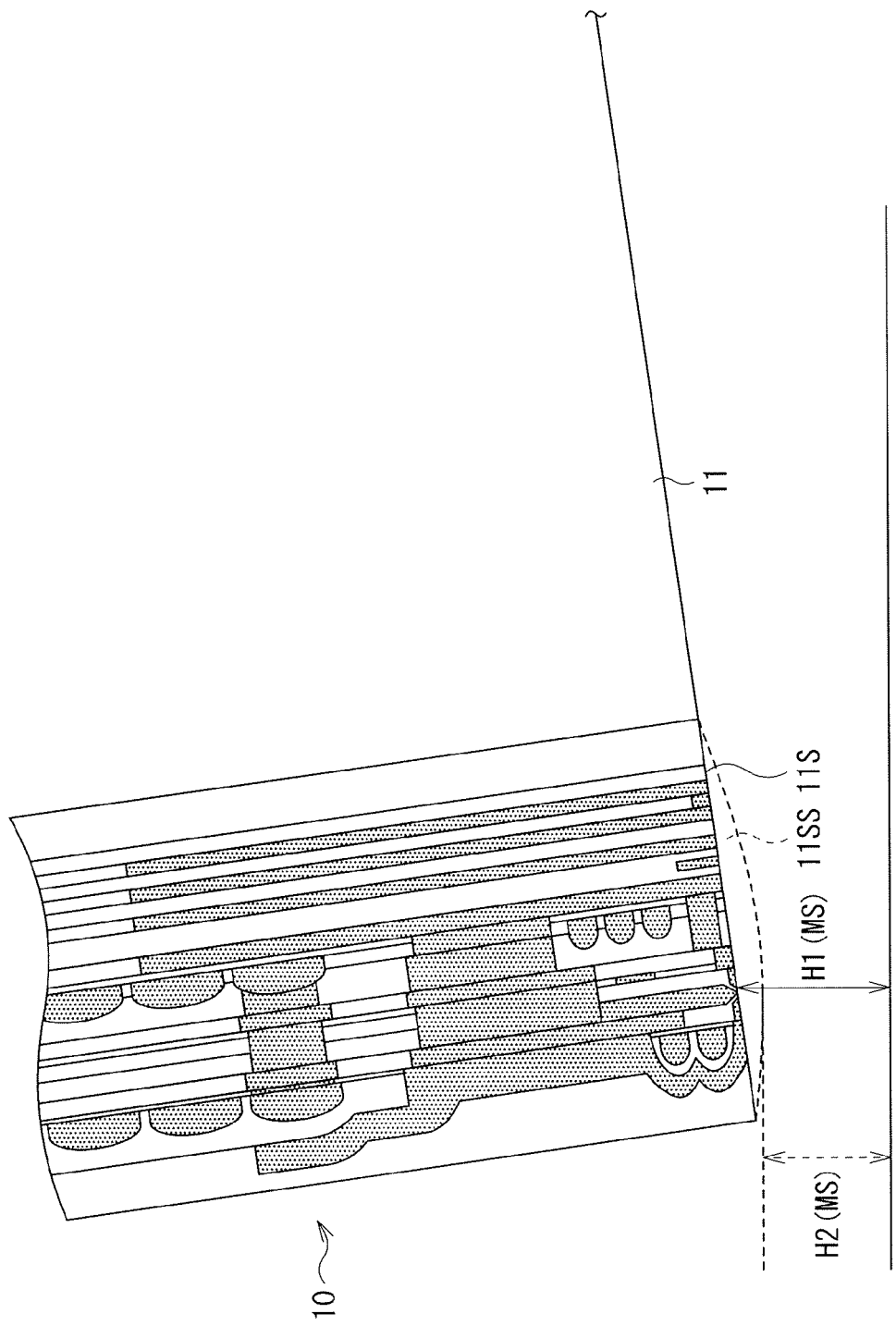
FIG. 5 is an explanatory diagram illustrating a state of a magnetic disk and the thin film magnetic head in driving, in the magnetic disk unit illustrated in FIG. 1.

Subsequently, operation and action of the magnetic disk unit including the thin film magnetic head 10 that is configured as above are described with reference to FIG. 5 in addition to FIG. 1 to FIG. 4. FIG. 5 is a sectional diagram illustrating positional relationship between the magnetic disk 2 and the thin film magnetic head 10 in writing or reproducing.

In this magnetic disk unit, when writing (recording) and reading (reproducing) of magnetic information are performed, the magnetic disk 2 is rotated at high speed in the direction of the arrow 2R (FIG. 1 and FIG. 5) by the spindle motor 9, and the slider 4A thereby floats from the recording surface 2S (FIG. 5). In this operation, the slider 4A leans forward such that the recording head section 16 of the thin film magnetic head 10 comes closer to the recording surface 2S, than the reproducing head section 14. A magnetic spacing MS becomes H1 immediately after the rotation of the magnetic disk 2 is stabilized.

Here, when the current is supplied to the heating element 50 to cause the heating element 50 to generate heat, surrounding parts thereof, in particular, the insulating layer 31 is thermally expanded. For this reason, the recording head section 16 is pushed out forward, and the ABS 11S protrudes up to a position of the ABS 11SS indicated by a broken line. As a result, the distance between the recording head section 16 and the recording surface 2S, namely, the magnetic spacing MS, is decreased to H2, which allows for writing into the recording track with a smaller width. In this operation, adjusting the amount of the current to be supplied to the heating element 50 makes it possible to control the degree of the protrusion.

Incidentally, stability of the magnetic domain structure of the magnetic material layer 151 may decrease due to the shape thereof, depending on the type of the magnetic material thereof. In the present embodiment, the resistance sensor 15 serving as the contact detection section has a laminated body including the magnetic material layer 151 and the antiferromagnetic material layer 152 serving as the magnetic-domain stabilizing structure that stabilizes the magnetic domain structure of the magnetic material layer 151. Such a configuration suppresses temporal variations in the magnetic domain structure of the magnetic material layer 151 due to influence of a disturbance magnetic field such as a magnetic field based on a servo signal, for example, thereby considerably stabilizing the magnetic domain structure.

In the thin film magnetic head 10 of the present embodiment, the resistance sensor 15 has the antiferromagnetic material layer 152 forming the laminated body with the magnetic material layer 151, as the magnetic-domain stabilizing structure. The magnetic domain structure of the magnetic material layer 151 is therefore unlikely to be affected by changes in the magnitude and direction of a disturbance magnetic field H, and a change in the magnetic domain structure in the magnetic material layer 151 is sufficiently suppressed. Therefore, occurrence of noise due to the disturbance magnetic field H is sufficiently removed, which makes it possible to detect contact between the ABS 11S of the thin film magnetic head 10 and the magnetic disk 2 with high accuracy. As a result, it is possible to control the floating height of the slider 4A with higher accuracy.

<Modifications>

Although the invention has been described above with reference to some embodiments, the invention is not limited to the above-described embodiments, and various modifications may be made. For example, although the perpendicular magnetic recording head of the invention is applied to a composite head, the application is not necessarily limited thereto, and the perpendicular magnetic recording head of the invention may be applied to a recording-only head not including a reproducing head section.

In addition, in the present embodiment, although the CPP-GMR element has been described as an example of the reproducing element, the reproducing element is not limited thereto. Alternatively, the reproducing element may be of current in the plane (CIP) type. Alternatively, a tunneling magnetoresistance (TMR) element including a tunnel junction film may be used.

(First Modification)

Figure 6:
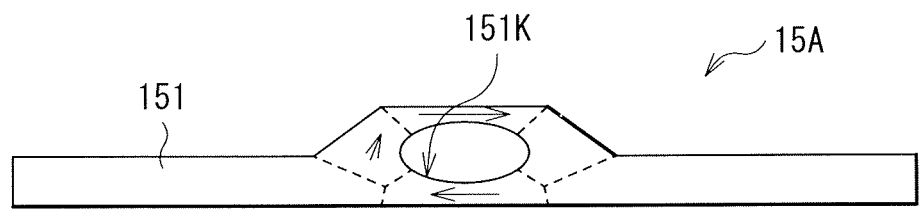
FIG. 6 is a plan view illustrating a contact detection section according to a first modification.

Further, various modifications may be made on the configuration (the shape) of the main part of the thin film magnetic head. A modification of the thin film magnetic head according to the above-described embodiment is described below. FIG. 6 is a plan view illustrating a resistance sensor 15A as a modification of the above-descried embodiment, and corresponds to FIG. 3 of the above-described embodiment (the resistance sensor 15).

The resistance sensor 15 of the above-described embodiment has the antiferromagnetic material layer forming the laminated body with the magnetic material layer, as the magnetic-domain stabilizing structure. In contrast, the resistance sensor 15A of the present modification has an opening 151K passing through the magnetic material layer 151 in a thickness direction, as a magnetic-domain stabilizing structure.

In this way, the opening 151K is provided, in particular, in the central region R15C where a change in the magnetic domain structure easily occurs in the magnetic material layer 151, and therefore magnetic domains around the opening 151K are stabilized. In other words, in the resistance sensor 15A, likewise, the magnetic domain structure of the magnetic material layer 151 is unlikely to be affected by changes in the magnitude and direction of the disturbance magnetic field H, and a change in the magnetic domain structure in the magnetic material layer 151 is sufficiently suppressed. Therefore, occurrence of noise due to the disturbance magnetic field H is sufficiently removed, which makes it possible to detect contact between the ABS 11S of the thin film magnetic head 10 and the magnetic disk 2 with high accuracy. As a result, it is possible to control the floating height of the slider 4A with higher accuracy.

(Second Modification)

Figure 7:
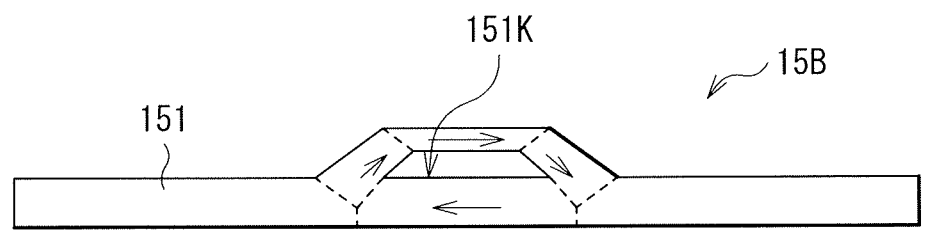
FIG. 7 is a plan view illustrating a contact detection section according to a second modification.

Note that the shape of the opening 151K is not limited to a circular shape illustrated in FIG. 6, and, for example, a polygon-shaped opening 151K of a resistance sensor 15B illustrated in FIG. 7 may be adopted.

(Third Modification)

Figure 8:
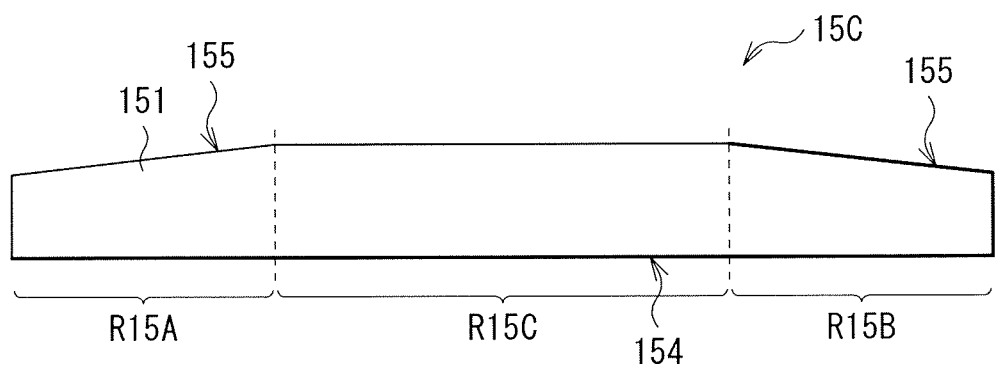
FIG. 8 is a plan view illustrating a contact detection section according to a third modification.

The magnetic material layer 151 may also be variously modified. For example, as represented by a resistance sensor 15C illustrated in FIG. 8, the magnetic material layer 151 including the central region R15C and the end regions R15A and R15B located next to respective sides of the central region R15C may be provided. In the present modification, the backward edge 155 is inclined to the forward edge 154 in the end regions R15A and R15B.

The correspondence relationships between the reference numerals and the components of the present embodiment are collectively illustrated as follows.

1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . driver, 7 . . . fixed shaft, 8 . . . bearing, 9 . . . spindle motor, 10 . . . thin film magnetic head, 11 . . . base, 11A . . . element forming surface, 11S . . . air bearing surface (ABS), 12 . . . insulating layer, 13 . . . insulating layer, 14 . . . reproducing head section, 15, 15A . . . resistance sensor, 151 . . . magnetic material layer, 151K . . . opening, 152 . . . antiferromagnetic material layer, 153A, 153B . . . electrode, 154 . . . forward edge, 155 . . . backward edge, 16 . . . recording head section, 17 . . . protective layer, 18 . . . lower coil, 181 . . . forward part, 182 . . . backward part, 19 . . . lower back gap, 20 (20A to 20D) . . . insulating layer, 21 . . . lower shield layer, 22 . . . MR element, 23 . . . upper shield layer, 24, 25, 27 . . . insulating layer, 26 . . . intermediate shield layer, 28 . . . lower yoke, 29 . . . leading shield, 31 . . . insulating layer, 32 . . . magnetic pole, 33 . . . pedestal yoke, 34 . . . insulating layer, 36 . . . pillar, 41 . . . upper coil, 411 . . . forward part, 412 . . . backward part, 43 . . . upper yoke, 44 . . . upper back gap, BG . . . back gap, 50 . . . heating element.

The invention claimed is:

1. A thin film magnetic head comprising:
a magnetic pole including an end surface exposed on an air bearing surface facing a medium; and a contact detection section including a magnetic material layer provided near the air bearing surface, and a magnetic-domain stabilizer that is configured to stabilize a magnetic domain structure of the magnetic material layer, wherein the contact detection section is configured to detect contact between the medium and the air bearing surface.

2. The thin film magnetic head according to claim 1, wherein the magnetic-domain stabilizer has an antiferromagnetic material layer forming a laminated body with the magnetic material layer.

3. The thin film magnetic head according to claim 1, wherein the magnetic-domain stabilizer has an opening passing therethrough in a thickness direction.

4. The thin film magnetic head according to claim 3, wherein the magnetic material layer includes a central region having a first height in a height direction orthogonal to the air bearing surface, and a pair of end regions facing each other with the central region provided therebetween and each having a second height less than the first height in the height direction, and the opening is provided in the central region of the magnetic material layer.

5. The thin film magnetic head according to claim 4, wherein the magnetic material layer includes a forward edge extending substantially parallel to the air bearing surface, and a backward edge including an inclination part inclined to the air bearing surface, and the inclination part is included in a connection region of the backward edge, the connection region being located between the pair of end regions and the central region.

6. The thin film magnetic head according to claim 1, wherein a temperature coefficient of resistance of the magnetic material layer is higher than a temperature coefficient of resistance of the magnetic pole.

7. The thin film magnetic head according to claim 1, wherein the magnetic material layer is made of a substance of nickel (Ni) or an alloy including nickel or iron.

8. The thin film magnetic head according to claim 1, further comprising a heating element configured to heat a vicinity of the magnetic pole.

9. A head gimbals assembly comprising:
a magnetic head slider including the thin film magnetic head according to claim 1; and
a suspension to which the magnetic head slider is attached.

10. A head arm assembly comprising:
a magnetic head slider including the thin film magnetic head according to claim 1;
a suspension including an end to which the magnetic head slider is attached; and
an arm supporting the other end of the suspension.

11. A magnetic disk unit provided with a magnetic recording medium and a head arm assembly, the head arm assembly comprising:
a magnetic head slider including the thin film magnetic head according to claim 1;
a suspension including an end to which the magnetic head slider is attached; and
an arm supporting the other end of the suspension.

12. The thin film magnetic head according to claim 1, wherein the contact detection section detects the contact by detecting heat generation between the medium and the air bearing surface based on a variation in electric resistance.

13. A thin film magnetic head comprising:
a magnetic pole including an end surface exposed on an air bearing surface facing a medium; and
a contact detection section including a magnetic material layer provided near the air bearing surface, the contact detection section being configured to detect contact between the medium and the air bearing surface, wherein the magnetic material layer includes a central region having a first height in a height direction orthogonal to the air bearing surface, and a pair of end regions facing each other with the central region provided therebetween and each having a second height less than the first height in the height direction.

* * * * *